United States Patent [19]

Sawano

[11] 3,895,858
[45] July 22, 1975

[54] LENS BARREL
[75] Inventor: Hiroshi Sawano, Tokyo, Japan
[73] Assignee: Konishiroku Photo Industry Co., Ltd., Tokyo, Japan
[22] Filed: July 25, 1974
[21] Appl. No.: 491,850

[30] Foreign Application Priority Data
July 30, 1973 Japan.................................. 48-84959

[52] U.S. Cl. .................. 350/255; 350/78; 354/158; 354/191
[51] Int. Cl. ............................................. G02b 7/02
[58] Field of Search ........ 350/255, 46, 78; 354/158, 354/190, 191, 286

[56] References Cited
UNITED STATES PATENTS

| | | | |
|---|---|---|---|
| 2,208,797 | 7/1940 | Kende | 350/78 UX |
| 2,925,022 | 2/1960 | Winkler et al. | 354/158 |
| 3,672,280 | 6/1972 | Imura | 350/255 UX |
| 3,709,129 | 1/1973 | Lange | 354/191 |

Primary Examiner—Ronald L. Wibert
Assistant Examiner—Paul K. Godwin
Attorney, Agent, or Firm—Bierman & Bierman

[57] ABSTRACT

This invention relates to a lens barrel having an interconnecting lever which is driven by the automatic exposure control mechanism provided in a camera body and in turn drives an diaphragm provided in the lens barrel; and a relatively long lens back. More particularly, this invention relates to a lens barrel being able to be shortened down from the length at the time of photographing at infinite distance, thus allowing compact housing of the lens barrel in a limited space.

7 Claims, 12 Drawing Figures

LENS BARREL

According to the common practice for shortening or contracting the lens barrel for compactly housing it in a camera case after completing photographing, first the lens supporting frame is turned at a certain angular distance and then, after removing a bayonet joint consisting of a plurality of clicks, the lens frame is pressed relative to the helicoidally threaded outer cylinder in the direction of light axis toward the camera body. According to such method, however, since the diaphragm controlling mechanism is also simultaneously turned with angular movement of the lens supporting frame, such method is unadaptable to a lens tube provided with an automatic diaphragm controlling mechanism which is driven through an angularly movable inter-connecting lever by an automatic exposure control mechanism provided in a camera body, such as for example the exchangable lens for a single-lens reflex camera.

This invention is designed to provide an improved lens barrel which can be adaptable to a single-lens reflex camera providing with an automatic exposure control mechanism. According to this invention, a lens barrel is provided, which comprises a focus ring having a first helicoid thread, a lens frame having a second helicoid thread engaging with said first helicoid thread, guide means to guide said lens frame without any angular displacement upon operation of said focus ring, means for stopping said lens frame to define a position where said lens frame is located for infinite-distance focusing and a manually operable member for releasing said stopping means from the stopping state to make said lens frame movable beyond said position. Variable embodiment may be provided within the scope of this invention. For example, the stopping means is provided on the stational member in the lens barrel or on the moving member such as the focus ring and the lens frame in the lens barrel. And further the stopping means may abut the focus ring or the lens frame. Still further, the manually operable member may be provided on the focus ring whereby modes of focusing operation and telescoping operation to out of the infinite-distance focusing position are greatly simplified. Due to the above feature, a lens barrel is greatly shortened with out any displacement of a disphragm contolling mechanism in the lens barrel, so that the lens barrel can be haused in a camera case and defects in the conventional lens barrel can be freed.

Other objects and advantages of this invention will become apparent from the following description and an drawings.

Figure 1:
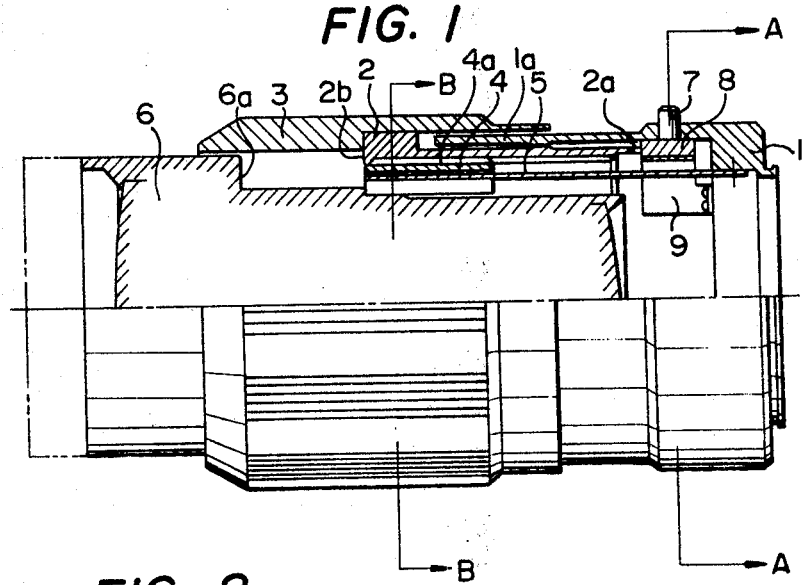
FIG. 1 shows an embodiment of this invention set for infinite-distance focusing.
Figure 3:
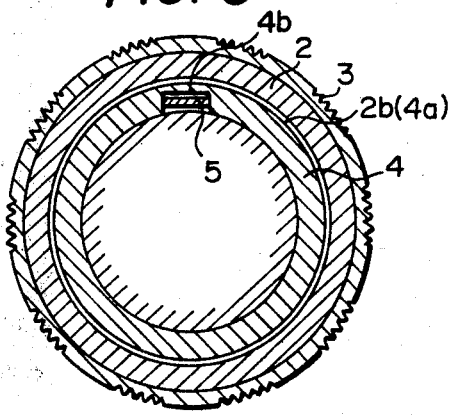
FIG. 3 is a sectional view along B—B in FIG. 1.

Referring to FIG. 1, there is shown a lens barrel set for infinite-distance focusing. A double-dot line shows the lens barrel set for short-distance focusing in FIG. 1. In the figure, 1 indicates a lens mount cylinder adapted for joining with the body portion of the camera. It is threadedly engaged with a first helicoid cylinder 2 and has fixed thereto a guide plate 5 adapted for guiding a second helicoid cylinder 4. Said first helicoid cylinder 2 has a guide thread 1a and a helicoid thread 4a, and a focus ring 3 is secured to said cylinder 2 so that the latter will be turned integral with the former. The second helicoid cylinder 4 has a helicoid thread 4a and a guide groove 4b (in FIG. 3) for guiding said guide plate 5. It is joined integral with a lens frame 6 and arranged to be able to move in the direction of optical axis without any angular displacement.

Figure 2:
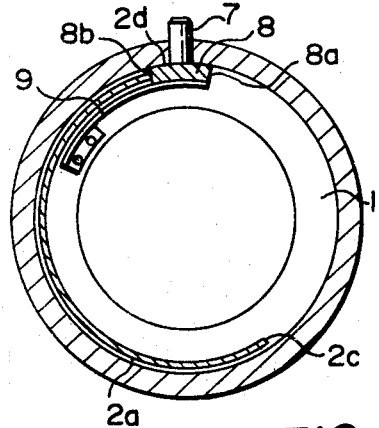
FIG. 2 is a sectional view along A—A in FIG. 1.
Figure 4:
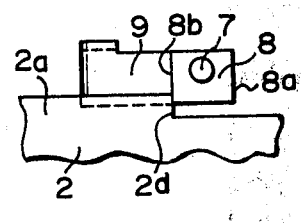
FIG. 4 is a partial plane view of FIG. 2.
Figure 5:
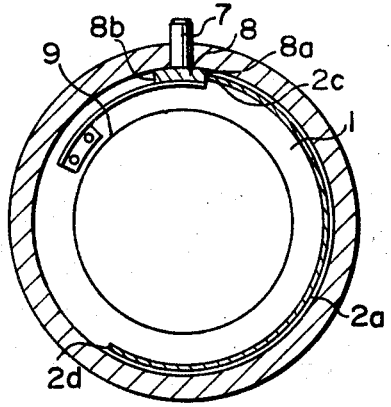
FIG. 5 is a view as same as FIG. 2 except that the lens barrel is set for short-distance focusing.
Figure 6:
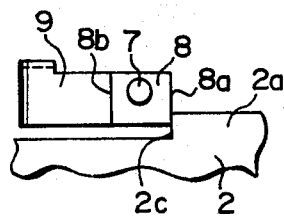
FIG. 6 shows a patial plane view of FIG. 5.
Figure 7:
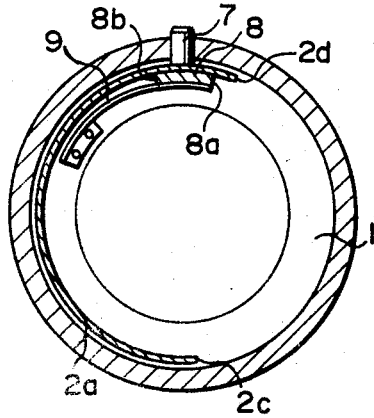
FIG. 7 is a view as same as FIG. 2 except that the lens barrel is telescoped to out of infinite-distance focusing.
Figure 8:
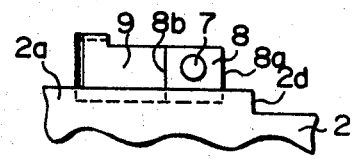
FIG. 8 is a patial plane view of FIG. 7.

FIG. 2 is a sectional view taken along the line A—A of FIG. 1, and FIG. 4 is a partial plane view of FIG. 2, showing a mechanism for contracting the lens barrel for facilitating its housing in a limited space. In this figure, numeral 7 designates a push button that can be operated from the outside of the lens mount fixing cylinder 1. A stopper 8 is secured to the bottom of said push button 7. It will be also seen that an end of a leaf spring 9 is fixed to said lens mount fixing cylinder 1 so that the other end of said leaf spring will press said button 7 and stopper 8 in the outwardly radial direction. It is also arranged such that an end 8b of the stopper 8 will hit against a cut-out end 2d of the first helicoid cylinder 2 to produce a situation that allows infinite distance focusing. FIG. 5 shows a situation where the arrangement has been changed from the infinite distance focusing position into the short distance focusing position by turning the focus ring 3 counterclockwise. In this case, another end 8a of the stopper 8 abuts against a cut-out end 2c of the first helicoid cylinder 2. FIG. 6 is a partial plane view of FIG. 5, and FIG. 7 shows a situation where, under the infinite-distance focusing state of FIG. 2, the push botton 7 is pushed and the focus ring 3 is turned clockwise so that the end 2a of the helicoid cylinder 2 will pass over while sliding on the outer peripheral surface of the stopper 8. In this situation, even if the hold on the button 7 is released, the stopper 8 keeps turning as it is forced toward the center of the optical axis by the drag of the leaf spring 9 against the outer peripheral surface. FIG. 8 is a partial plane view of FIG. 7, and FIG. 9 shows a situation where the lens tube has been contracted to its minimum length and housed in its non-used position.

Now, the operation of the present invention is described while referring to FIGS. 1 to 9.

In normal photographing practice, when the focus ring 3 at the infinite-distance focusing position shown in FIG. 1 is turned counterclockwise as viewed from the front side of the lens tube, the first helicoid cylinder 2 which is integrally fixed to said focus ring 3 is also turned in accordance with movement of said focus ring, and consequently, the guide thread 1a is threadedly engaged with the lens mount fixing cylinder 1 and also the helicoid thread 2b of the first helicoid cylinder 2 is threadedly engaged with the second helicoid cylinder 4, while the lens frame 6 integrally secured to said second helicoid cylinder 4 is advanced without angular displacement by the guide plate 5 to the position shown by the double-dot lines, thus producing a short distance focusing condition in which the lens tube is extended out to its maximum length. When it is desired to restore the original infinite distance position, one has only to turn the focus ring 3 clockwise as viewed from the front side of the lens tube until the end 2d of the first helicoid cylinder 2 abuts against the corresponding end 8b of the stopper 8 as shown in FIG. 2.

Figure 9:
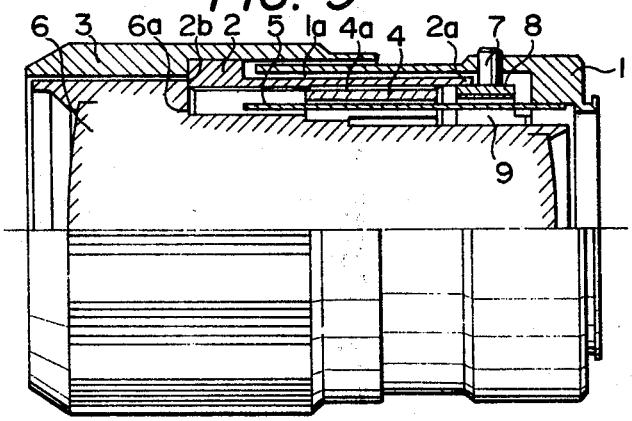
FIG. 9 shows the lens barrel telescoped to out of infinite-distance focusing.

When the lens barrel is not used and it is desired to contract it to its minimum length and house it in the camera case, the button 7 at the infinite-distance focusing position shown in FIG. 2 is pushed down toward the center of the optical axis of the lens barrel and, while keeping said button depressed, the focus ring 3 is turned clockwise so that the stopper 8 is pressed by the end 2a of the first helicoid cylinder 2 against the leaf spring 9 as shown in FIG. 7, and then said ring is further turned clockwise, causing the lens mounting frame 6 integrally engaged with the second helicoid cylinder 4 to move rearward linearly from the position of FIG. 1, until the shoulder 6a of said frame 6 abuts against the end 2b of the first helicoid cylinder 2 as shown in FIG. 9. As this situation is reached, the cut-out end 2c of the first helicoid cylinder 2 passes over the outer peripheral face of the stopper 8 to release the button 7 from its depressed position just as in the short distance focusing situation shown in FIG. 5. Under this condition, the lens barrel is in its most contracted state.

For again restoring the thus contracted lens barrel to its stretched-out length for use, the button 7 in the position of FIG. 5 is pushed and, while keeping it depressed, the focus ring 3 is turned counterclockwise, whereby the end 2a of the first helicoid cylinder 2 integrally fixed to said focus ring is forced to turn the stopper 8 while depressing it, and when the cut-out end portion 2d gets over the outer peripheral face of the stopper 8, the button 7 is returned to its original position by the drag of the leaf spring 9, thereby restoring the infinite distance focusing situation shown in FIG. 2.

The button 7 is returned to its original position by the action of the leaf spring 9 concurrently with abutment of the end 6a of the lens mounting frame 6 against the end 2b of the first helicoid cylinder 2. The most contracted state of the lens barrel can be determined from the lead of the helicoid thread 4a of the second helicoid cylinder 4 and the lead of the guide thread 1a of the lens mount fixing cylinder 1, with relation to the movement from the infinite-distance focusing position to the short distance focusing position.

Figure 10:
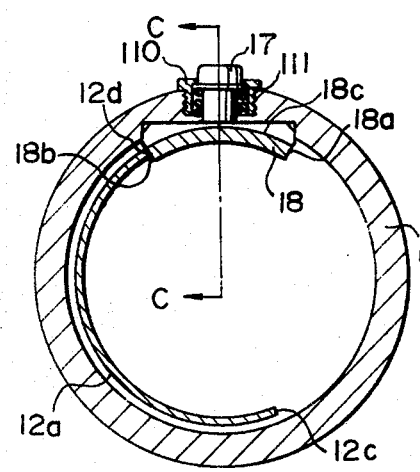
FIG. 10 is a cross sectional view of the lens barrel according to another embodiment of this invention, the lens barrel being set for infinite-distance focusing.
Figure 12:
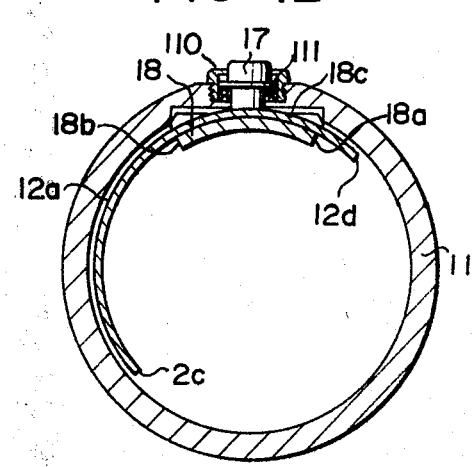
FIG. 12 is a sectional view as same as FIG. 10 except that the lens barrel is telescoped to out of infinite distance focusing.
Figure 11:
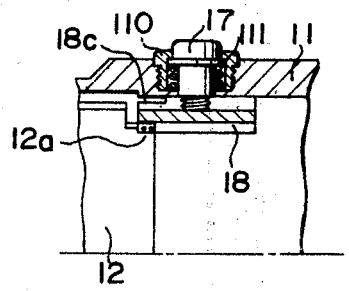
FIG. 11 is a sectional view of FIG. 10 along C—C.

FIGS. 10, 11 and 12 show a mechanism for contracting the lens barrel to its shortest length for housing according to another embodiment of the present invention. In the embodiment of FIG. 10, a part of the inner wall of the lens mount fixing cylinder 11 is formed planely and the stopper 18 is slidingly engaged with said inner wall, with both ends 18a and 18b of said stopper 18 being directed in the circumferential direction such that one of the ends 18b will abut against the corresponding cut-out end 12d of the first helicoid cylinder 12. A button 17 is planted in the central part of the stopper 18 and a slide ring 110 is screwed into the lens mount fixing cylinder 11. The stopper is arranged slidable relative to said slide ring 110 so as to urge said button 17 in its outer peripheral direction against the force of a coil spring 111. FIG. 11 is a sectional view of FIG. 10 along the line C—C and in which numeral 8c indicates the sliding face of the stopper 18 which slides on the inner peripheral surface of the end portion 12a of the first helicoid cylinder 12. FIG. 12 shows a situation where the button 17 has been pushed from the position of FIG. 10 and, while keeping said button depressed, the focus ring 13 has been turned clockwise. According to this embodiment, if the buttton 17 is pushed down from the infinite distance focusing position of FIG. 10, the stopper 18 is also depressed against coil spring 111, and when the focus ring 13 is turned clockwise while keeping said stopper depressed, the inner peripheral face of the end portion 12a of the first helicoid cylinder 12 is urged to slide with the corresponding sliding face 18c of the stopper 18, and if said clockwise turn is further continued, the cutout end 12c of the end portion 12a of the first helicoid cylinder 12 comes to abut against the end face 18a of the stopper 18, whereupon the stopper 18 is allowed to return to its original position, thus producing the most contracted situation convenient for housing of the lens barrel. For again restoring the stretched-out condition for use, the same procedure as in the preceding embodiment is repeated by operating the button 17.

Being constructed as described above, the lens barrel according to the present invention can perform the completely same effect as ordinary lens barrels in normal photographing practice, and when not used, the total length of the lens tube can be shortened for convenient housing in a limited space by merely operating an operating member from the outside of the lens barrel, and hence the invention proves most effective when adapted with a lens barrel having a long back-focus. Thus, the present invention can greatly compact the camera set to make it handy to carry and also allows easy containment in a candid camera case.

What is claimed is;

1. A lens barrel comprising
   a. a focus ring having a first helicoid thread,
   b. a lens frame having a second helicoid thread engaging with said first helicoid
   c. guide means to guide said lens frame without any angular displacement upon operation of said focus ring,
   d. means for stopping said lens frame to define a position where said lens frame is located for infinite-distance-focusing, and
   e. a manually operable member for releasing said stopping means from the stopping state to make said lens frame movable beyond said position.

2. A lens barrel according to claim 1, further comprising means for moving said lens frame beyond said position.

3. A lens barrel according to claim 2, wherein said lens moving means is said focus ring.

4. A lens barrel according to claim 1, wherein said stopping means engage with said lens frame 5. A lens barrel according to claim 1, wherein said stopping means engage with said focus ring.

6. A lens barrel according to claim 1, wherein said stopping means are provided on any one of said focus ring and said lens frame and displaced to out of stopping state by said manually operable member.

7. A lens barrel according to claim 1, wherein said manually operable member is provided on said focus ring.

* * * * *